US012173491B2

(12) United States Patent
Gibson

(10) Patent No.: US 12,173,491 B2
(45) Date of Patent: Dec. 24, 2024

(54) ADA-COMPLIANT TEMPORARY SINK

(71) Applicant: Jag Mobile Solutions, Inc., Howe, IN (US)

(72) Inventor: William L. Gibson, Angola, IN (US)

(*) Notice: Subject to any disclaimer, the term of this patent is extended or adjusted under 35 U.S.C. 154(b) by 0 days.

(21) Appl. No.: 17/679,694

(22) Filed: Feb. 24, 2022

(65) Prior Publication Data

US 2023/0243136 A1 Aug. 3, 2023

Related U.S. Application Data

(60) Provisional application No. 63/153,581, filed on Feb. 25, 2021.

(51) Int. Cl.
*E03C 1/32* (2006.01)
*B60R 15/02* (2006.01)
*E03C 1/182* (2006.01)

(52) U.S. Cl.
CPC ............... *E03C 1/32* (2013.01); *B60R 15/02* (2013.01); *E03C 1/182* (2013.01)

(58) Field of Classification Search
CPC ... E03C 1/18; E03C 1/182; E03C 1/23; A47K 1/02; A47K 1/04; A47K 1/05; A47K 1/10; A47K 1/12; B60R 15/02
See application file for complete search history.

(56) References Cited

U.S. PATENT DOCUMENTS

| 5,561,871 | A | * | 10/1996 | Laughton | ............... E03C 1/18 4/619 |
| 5,803,417 | A | * | 9/1998 | McNamara | ............ A47K 1/02 297/188.21 |
| 11,064,843 | B1 | * | 7/2021 | Swartz | ............... E04H 1/1205 |
| 2021/0321829 | A1 | * | 10/2021 | Shell | .................. A47K 1/02 |
| 2022/0225841 | A1 | * | 7/2022 | O'Shea | ................. B60P 3/225 |

OTHER PUBLICATIONS

2010 ADA Design Standards, available at https://www.ada.gov/law-and-regs/design-standards/. (Year: 2024).*

* cited by examiner

*Primary Examiner* — Erin Deery
(74) *Attorney, Agent, or Firm* — Barnes & Thornburg LLP

(57) ABSTRACT

A temporary wash basin for a trailer is provided. The temporary wash basin includes a sink portion, a faucet portion, and a pedestal portion. The sink portion includes a basin defining a drain. The faucet portion is connectable to at least one water supply line and controls flow of water into the basin. The pedestal portion suspends the sink portion above a surface at a suitable height to establish sufficient knee clearance to comply with the American with Disabilities Act (ADA). The pedestal portion includes a mounting member to releasably mount the pedestal portion to a portion of the trailer, such as the tongue of the trailer.

20 Claims, 8 Drawing Sheets

ADA-COMPLIANT TEMPORARY SINK

RELATED APPLICATION

This application claims the benefit of U.S. Provisional Application Ser. No. 63/153,581 filed Feb. 25, 2021 for an "ADA-Compliant Temporary Sink," which is hereby incorporated by reference in its entirety.

TECHNICAL FIELD

This disclosure relates generally to wash basins for mobile trailers; in particular, this disclosure relates to an ADA-compliant temporary sink for use in conjunction with a trailer.

BACKGROUND

Mobile trailers are often transported to work sites, festivals, and other events to provide accommodations, restrooms, and/or meeting places. For example, some trailers can provide one or multiple stalls of bathroom facilities. In some cases, trailers can include externally-accessible wash basin(s) that can be used without entering the trailer. Although these wash basins are externally accessible, they are installed within the trailer's footprint and access is provided through an exterior door. When the exterior door is open, users can access the wash basin(s) from outside the trailer by leaning through the opening.

FIG. 1 illustrates a prior art trailer 10 with externally-accessible wash basins 12. The trailer 10 includes a door 14 that is movable to an open position (as shown in FIG. 1) that provides access to an internal cavity 16 of the trailer 10 in which the wash basins 12 are installed and a closed position that blocks access to the internal cavity 16. When in the closed position, the door 14 forms a portion of an exterior wall 18 of the trailer 10. However, when the door 14 is in the open position, the wash basins 12 can be accessed from outside the trailer 10 by leaning through the opening of the door 14 into the internal cavity 16. As shown in FIG. 1, the wash basins 12 include one or more sinks 20 and one or more faucets 22 that can be actuated by leaning into the internal cavity 16. A plurality of paper towel dispensers 24 are also mounted within the internal cavity 16.

While the type of externally-accessible wash basins 12 shown in FIG. 1 are acceptable for some users, they present difficulties for wheelchair-bound users, who cannot lean through the opening to access the wash basins 12. In the trailer 10 shown in FIG. 1, for example, the trailer's exterior wall 18 blocks wheelchair users from getting close enough to use the wash basins 12. Moreover, there is no knee space for a wheelchair user to slide underneath the wash basins 12 due to the trailer's 10 exterior wall 18. Additionally, while the height of the sinks 20, faucets 22, and towel dispensers 24 may be acceptable for standing users leaning through the opening, they may present difficulties for users in wheelchairs. Since there is insufficient knee space for wheelchair-bound users, among other possible reasons, these wash basins 12 are not compliant with Americans with Disabilities Act (ADA) regulations.

Therefore, there is a need for an ADA-compliant wash basin that can be accessed outside a trailer.

SUMMARY

According to one aspect, this disclosure provides a temporary wash basin for a trailer. The temporary wash basin includes a sink portion, a faucet portion, and a pedestal portion. The sink portion includes a basin defining a drain. The faucet portion is connectable to at least one water supply line. The faucet portion is configured to control flow of water from the at least one water supply line into the basin. The pedestal portion suspends the sink portion above a surface, such as the ground, at a suitable height to establish sufficient knee clearance to comply with the American with Disabilities Act (ADA). The pedestal portion includes a mounting member to releasably mount the pedestal portion to an attachment member of a trailer.

According to another aspect, this disclosure provides a trailer with a trailer body, a trailer tongue, and a temporary wash basin. The trailer body defines an interior space. The trailer tongue extends from the trailer body for coupling the trailer body to a vehicle. The temporary wash basin is configured to be releasably mounted to one or more of the trailer body or the trailer tongue. The temporary wash basin, when mounted, is configured to be suspended above a ground at a suitable height to establish sufficient knee clearance to comply with the American with Disabilities Act (ADA).

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
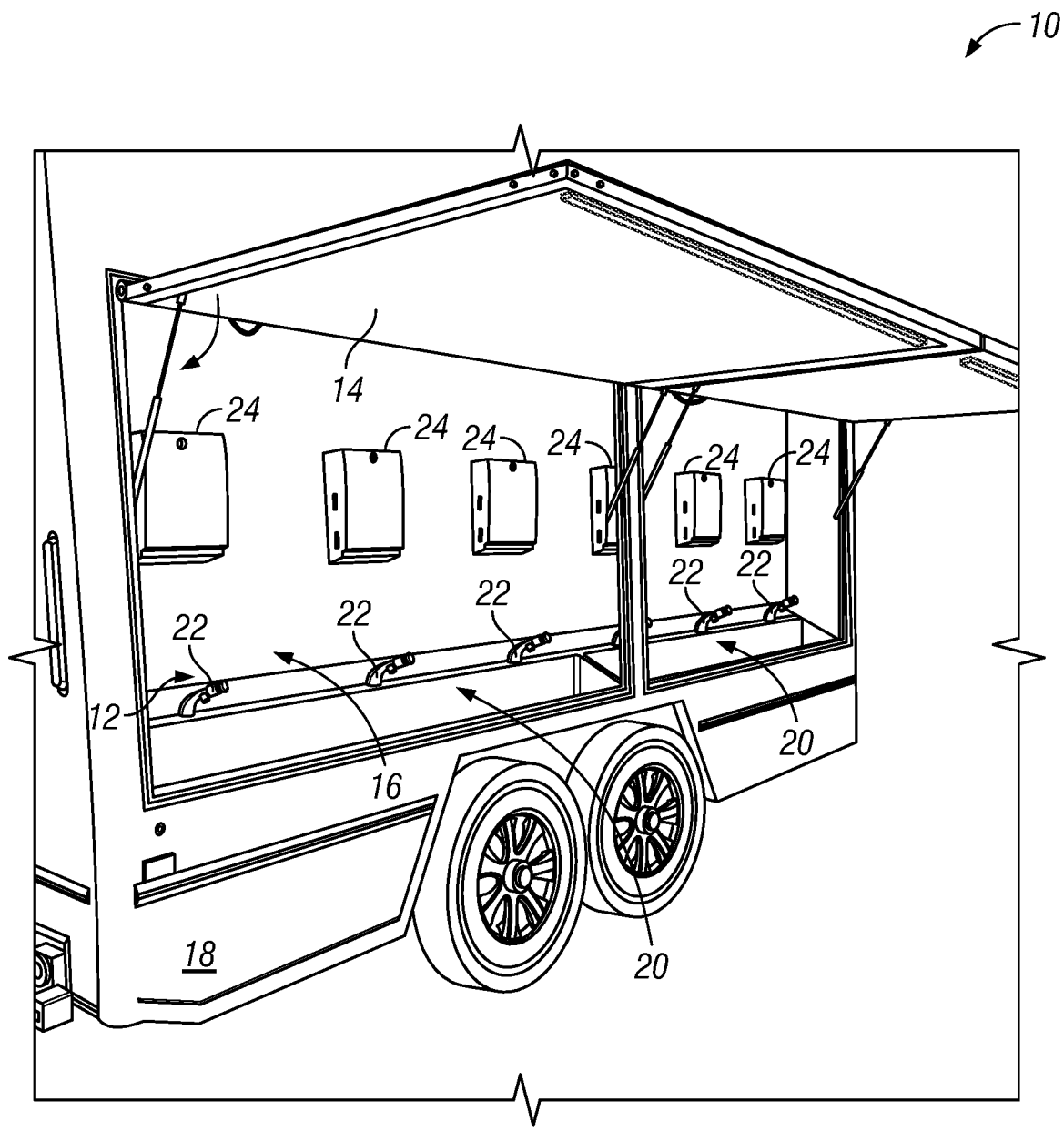
FIG. 1 is a side perspective view of a prior art trailer with externally-accessible wash basins.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural features may be shown in specific arrangements. However, it should be appreciated that such specific arrangements may not be required. Rather, in some embodiments, such features may be arranged in a different manner than shown in the illustrative figures. Additionally, the inclusion of a structural in a particular figure is not meant to imply that such feature is required in all embodiments and, in some embodiments, may not be included or may be combined with other features.

Figure 2A:
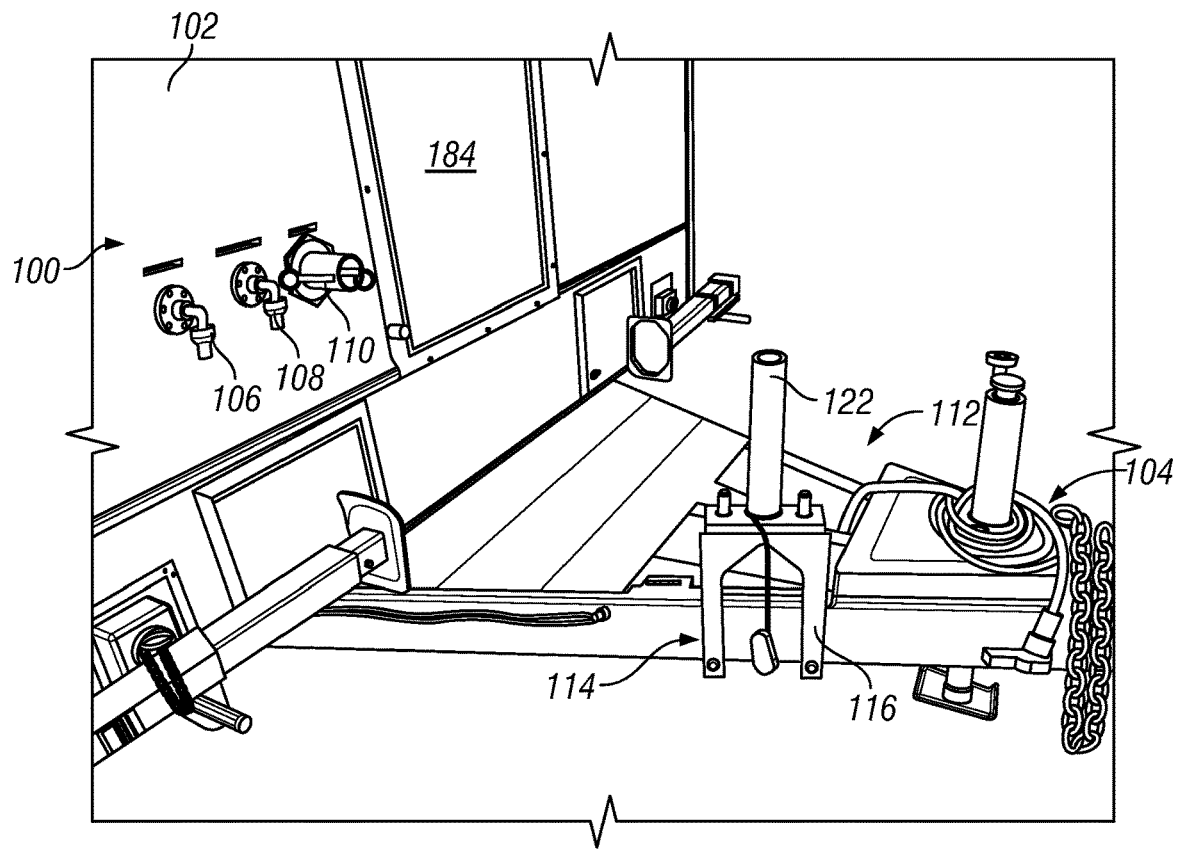
FIG. 2A is a side perspective view of a trailer with an attachment member for mounting an ADA-compliant sink assembly attached to the tongue of the trailer.
Figure 2B:
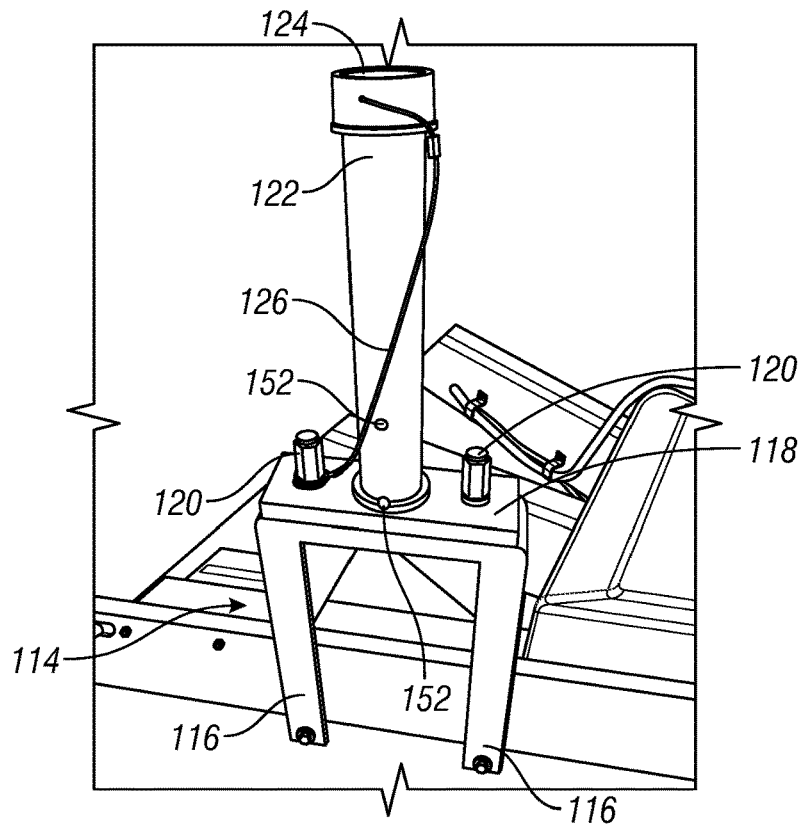
FIG. 2B is a side perspective view of the attachment member shown in FIG. 2A with a cap attached for transport.

Referring now to FIGS. 2A and 2B, there is shown a trailer 100 with a trailer body 102 that defines an interior space and a tongue 104 extending from the trailer body 102 that may be connected with a vehicle to haul the trailer 100 to a desired destination. Although the trailer 100 includes a tongue 104 for connecting with a vehicle in the embodiment shown, one skilled in the art should appreciate that other devices for connecting the trailer 100 to a vehicle for transport may be used; additionally, in some embodiments, the trailer 100 could be embodied as a motor vehicle itself, such as a recreation vehicle (RV), that does not need a separate vehicle to be transported.

As shown, the trailer 100 includes a plurality of fluid hookups, such as a drain hookup 106, a fresh water supply hookup 108, and a fresh water fill hookup 110. For example, the drain hookup 106 may be in fluid communication with a drain tank (not shown) inside the trailer body 102, and can be fluidly connected with the drain line of the temporary wash basin as discussed herein. During use, gray water drained from the temporary wash basin 128 (FIG. 3) can be collected in the drain tank (not shown) within the trailer 100 as discussed herein. The fresh water supply hookup 108 may be fluidly connected with a water supply tank (not shown) inside the trailer body 102, which can be connected to the temporary wash basin 128 to supply water for the faucet as discussed herein. During use, fresh water supplied by the water supply tank (not shown) can be provided to the temporary wash basin 128 through the faucet. The fresh water supply hookup 108 may be fluidly connected with the water supply tank (not shown) to refill the water supply for the temporary wash basin. In the example shown, the trailer body 102 includes a door 184 for accessing the inside of the trailer 100. As discussed herein, the temporary wash basin 128 may be mounted within the trailer 100 during transport depending on the circumstances.

In the example shown, there is an attachment member 112 extending from the tongue 104 for mounting the temporary wash basin 128. In some embodiments, the attachment member 112 could be connected to other portions of the tongue 104 or trailer body 102. The attachment member 112 could be connected to the tongue 104 or trailer body 102 with a fixed connection as shown in FIGS. 2A and 2B. By way of example only, embodiments are contemplated in which the attachment member 112 could be movable between an extended position extending from the trailer body 102 or tongue 104 and a retracted position underneath the trailer body or tongue 104 depending on the circumstances.

As shown, the attachment member 112 includes a base portion 114 with a plurality of legs 116 attached to the tongue 104 extending from a base plate 118. In this example, the base plate 118 is connected with the legs 116 using fasteners 120. The attachment member 112 includes a post 122 extending from the base plate 118, which is configured to receive a portion of the temporary wash basin 128 for mounting the temporary wash basin 128 during use. In the example shown, the post 122 extends approximately transversely from the base plate 118. Depending on the circumstances, a cap 124 may be attached to an end of the post 122 as shown in FIG. 2B during transport to prevent contaminants from entering within the post 122. A retaining cord 126 may connect the cap 124 to the base portion 114 to prevent the cap 124 from being misplaced.

Figure 3:
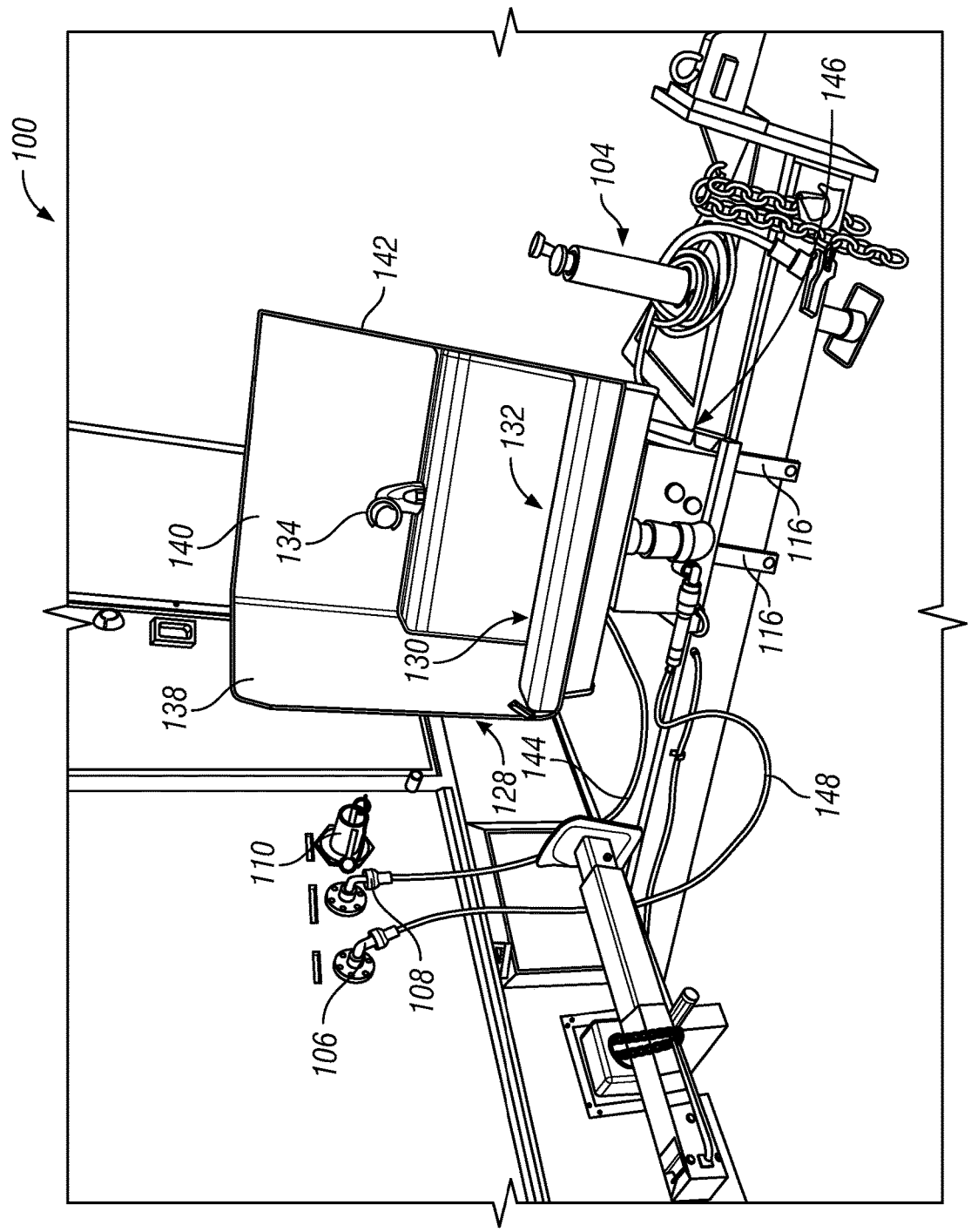
FIG. 3 is a front perspective view of a temporary ADA-compliant sink assembly mounted to the attachment member of the trailer in an extended position.

FIG. 3 illustrates an example temporary wash basin 128 mounted to the attachment member 112. In the example shown, the temporary wash basin 128 includes a sink portion 130 with a basin 132, a faucet portion 134 to control flow of water into the basin 132, and a pedestal portion 136 (see FIG. 4) to mount the temporary wash basin 128 to the attachment member 112. Although the temporary wash basin 128 is shown with a single sink portion 130 and single faucet portion 134, multiple sink portions 130 and faucet portions 134 could be provided depending on the circumstances. In the example shown, the temporary wash basin 128 extends transversely from the tongue 104 to provide sufficient knee clearance underneath the temporary wash basin 128 to comply with the American with Disabilities Act (ADA) so a wheelchair-bound user can be positioned close enough to the sink portion 130 and the faucet portion 134 to use the temporary wash basin 128. Likewise, the height of the sink portion 130 and the faucet portion 134 are suspended above the ground by the pedestal portion 136 in accordance with ADA requirements.

In the example shown, the temporary wash basin 128 includes a first wall 138, a second wall 140, and a third wall 142 surrounding the perimeter of the temporary wash basin 128. As discussed herein, one or more of the walls 138, 140, 142 could be used to mount accessories for the temporary wash basin 128, such as a soap dispenser and/or paper towel dispenser (see FIGS. 8-9).

In the example shown, a fresh water supply line 144 is fluidly connected between the fresh water supply hookup 108 and the faucet portion 134, which provides a water supply to the temporary wash basin 128. Although a single fresh water supply line 144 is shown for purposes of example, more than one supply line (e.g., cold and hot water supply lines) could be provided depending upon the circumstances. As shown, a drain line 148 is fluidly connected between the drain hookup 106 and a gray water disposal assembly 146, which periodically pumps gray water that has drained out of the basin 132 into a drain tank (not shown) within the trailer 100.

Figure 4:
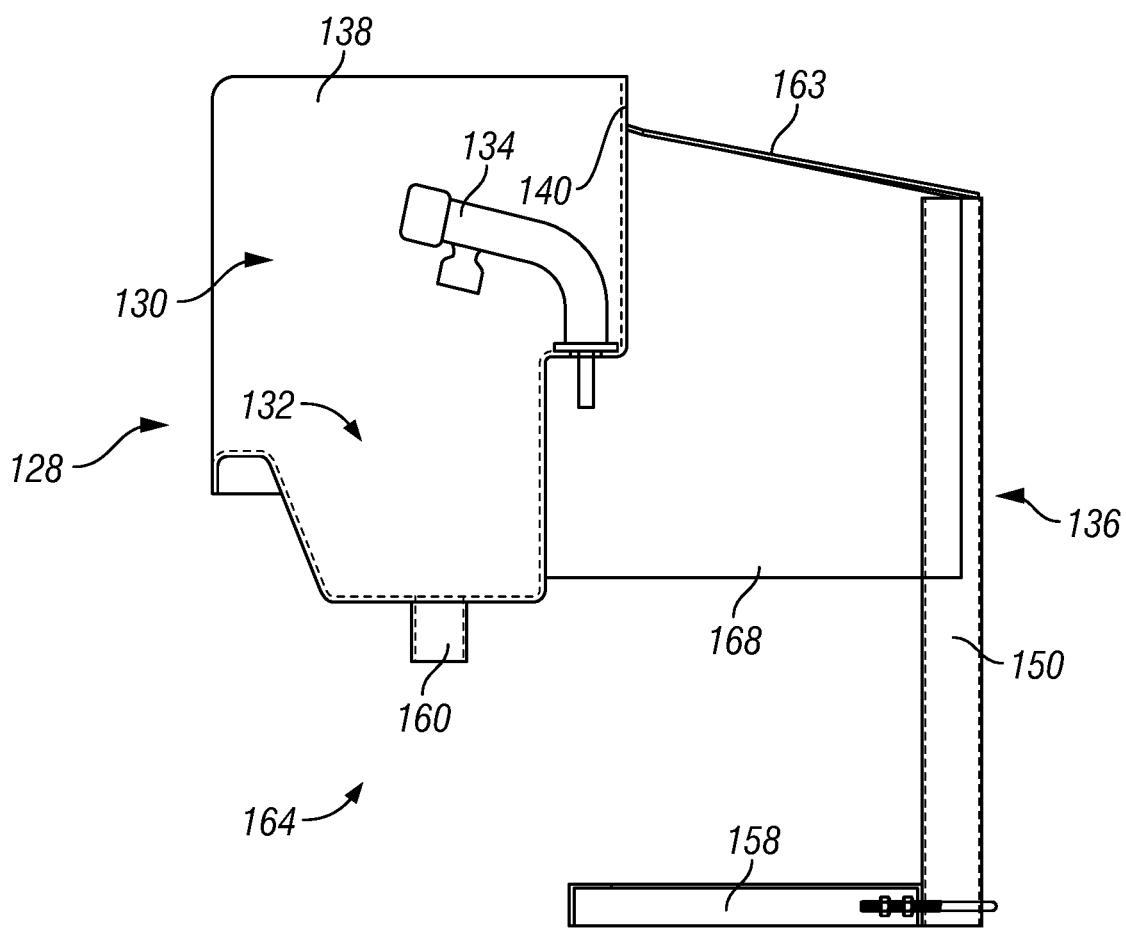
FIG. 4 is a side view of the temporary ADA-compliant sink assembly shown in FIG. 3 without the gray water collection assembly.
Figure 7:
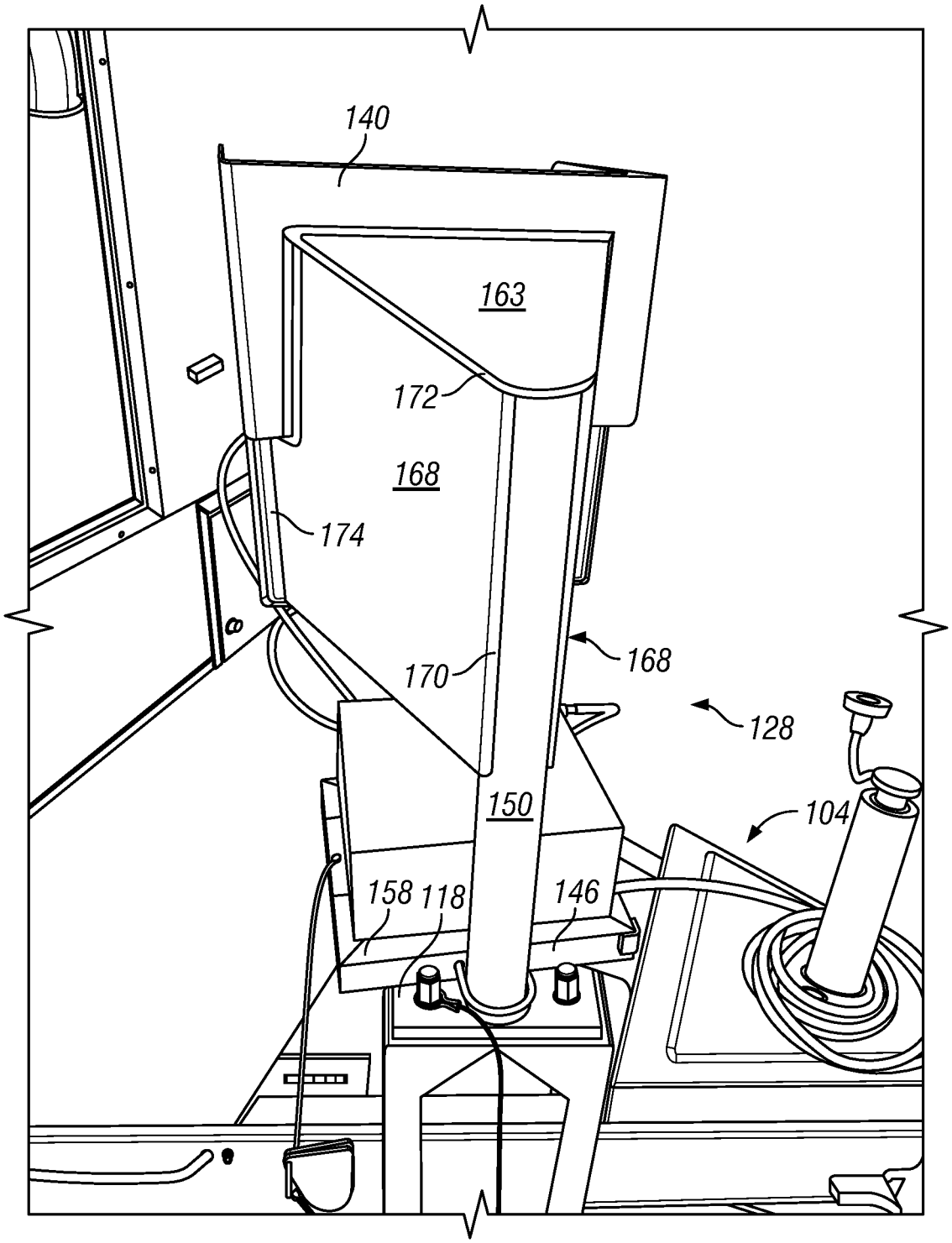
FIG. 7 is a rear perspective view of the ADA-compliant sink assembly shown in FIG. 3 in the retracted position with the sink assembly positioned of the tongue of the trailer.
Figure 10:
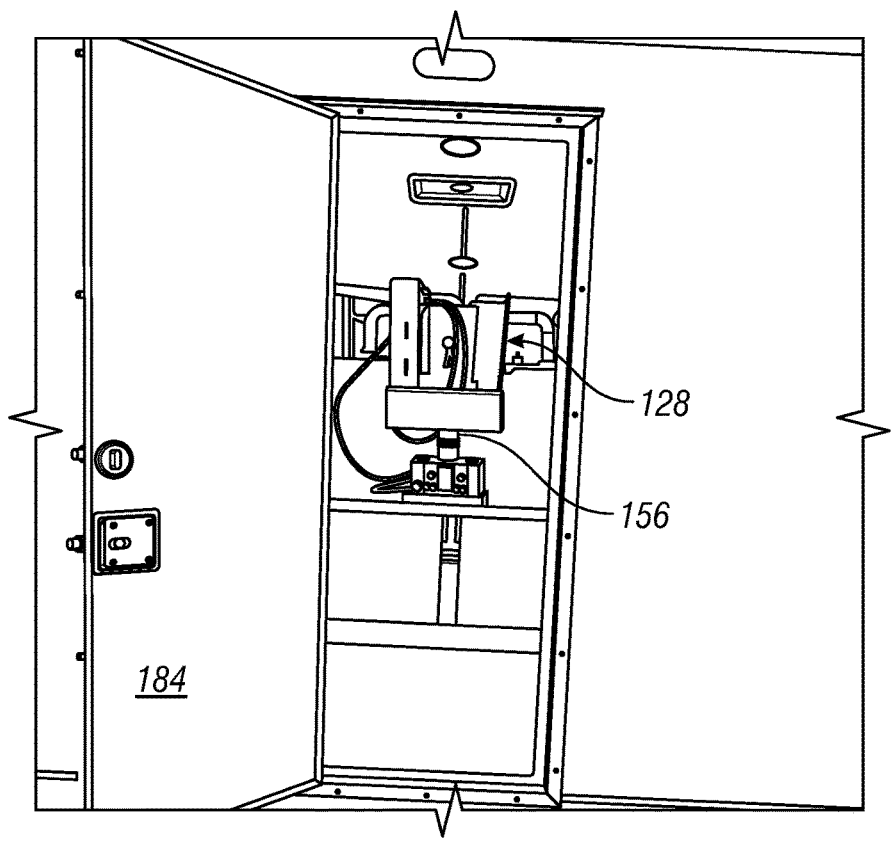
FIG. 10 is a perspective view of the temporary ADA-compliant sink assembly mounted within the trailer for transport.

Referring now to FIG. 4, there is shown a right side view of the temporary wash basin 128 without the lines 144, 148 attached and the gray water disposal assembly 146 removed. As shown, the pedestal portion 136 includes a sleeve 150 with an internal opening dimensioned to receive the post 122 of the attachment member 112. The post 122 slidably receives the sleeve 150 to mount the temporary wash basin 128 on the attachment member 112. In the embodiment shown, both the post 122 and sleeve 150 have a cylindrical shape to allow rotation therebetween, which allows the temporary wash basin 128 to swivel with respect to the tongue 104 between an extended position and a retracted position. For example, the temporary wash basin 128 may rotate to an extended position as shown in FIG. 3 in which the temporary wash basin 128 extends transversely away from the tongue 104 so there is sufficient knee clearance for a wheelchair-bound user to use the temporary wash basin 128. In the retracted position, the temporary wash basin 128 may be positioned above the tongue 104 and within the footprint of the tongue 104 for transport as shown in FIG. 7. Alternatively, the temporary wash basin 128 may be removed from the attachment member 112 and mounted on a second attachment member 156 within the trailer 100 for transport as shown in FIG. 10. The second attachment member 156 could be functionally equivalent to the attachment member 112, but installed within the trailer 100 so the temporary wash basin 128 can be secured within the trailer 100 for transport. When the trailer 100 gets to its destination, the temporary wash basin 128 could be moved from the second attachment member 156 and mounted on the attachment member 112 for use.

In some embodiments, the post 122 may include one or more holes 152 (FIG. 2B) that can be aligned with one or more holes 154 in the sleeve 150. A pin (not shown) can be placed through the holes 152, 154 to create an interference fit between the post 122 and sleeve 150. While an interference connection is shown for purposes of example, other types of connections could be used, such as frictional fit, bayonet connection, etc.

Figure 6:
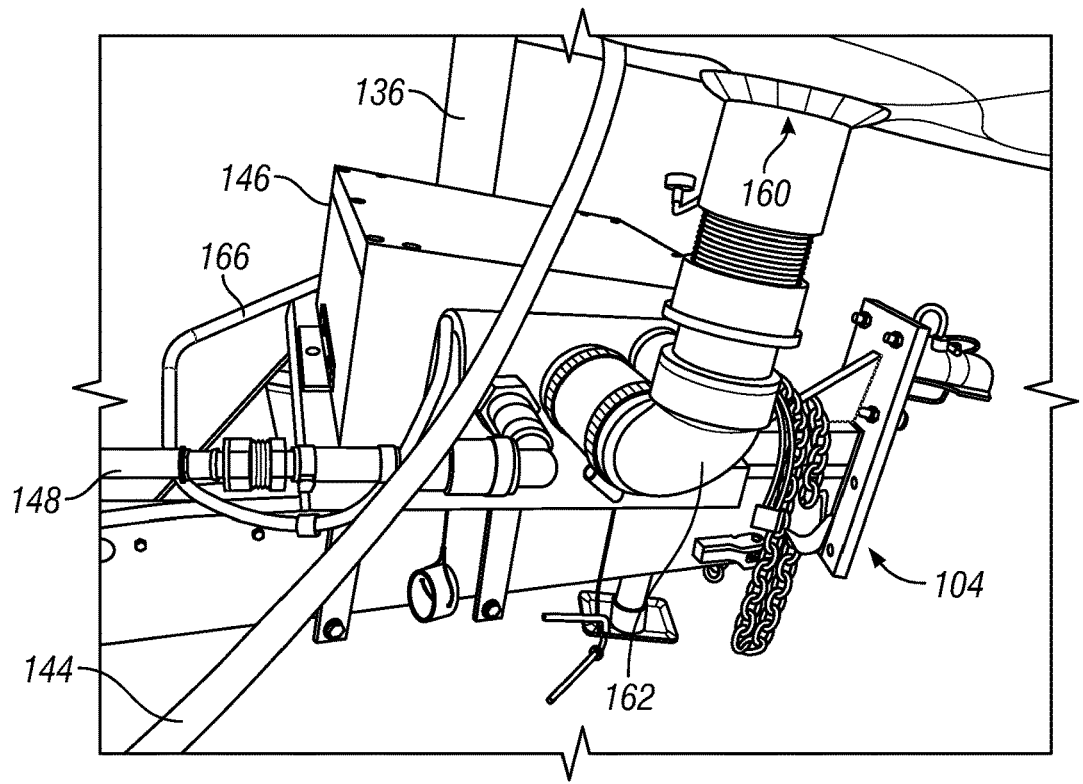
FIG. 6 is a detailed perspective view of certain fluid connections of the ADA-compliant sink assembly shown in FIG. 3.

In the embodiment shown, a tray 158 extends transversely from an end of the sleeve 150 for holding the gray water disposal assembly 146. As discussed herein, the gray water disposal assembly 146 has an inlet port connected with a drain 160 of basin 132 using a drain pipe 162 (FIG. 6). The gray water disposal assembly 146 includes a pump for conveying gray water out of the gray water disposal assembly 146 through the drain line 148 into the drain tank within the trailer 100. In some embodiments, the gray water disposal assembly 146 includes a fluid level sensor to determine a level of gray water within the gray water disposal assembly 146. The pump could be configured to actuate when the gray water level reaches a predetermined level based on the fluid level sensor similar to a sump pump. In some embodiments, the gray water disposal assembly 146 includes a button, switch or other mechanism for the user to manually actuate the pump to clear the gray water out of the gray water disposal assembly 146. The electronics, such as pump and fluid level sensor, could be powered by an external power source, batteries, solar power panels, etc.

A rear wall 163 is connected between the pedestal portion 136 and the second wall 140 of the sink portion 130. As shown, the sink portion 130 is connected to the pedestal portion 136 in a cantilevered manner, which provides space 164 beneath the sink portion 130 for knee clearance of wheelchair-bound users in compliance with ADA requirements. As discussed herein, the walls 138, 140, 142 could be configured to mount accessories, such as a paper towel dispenser, soap dispenser, etc.

Figure 5:
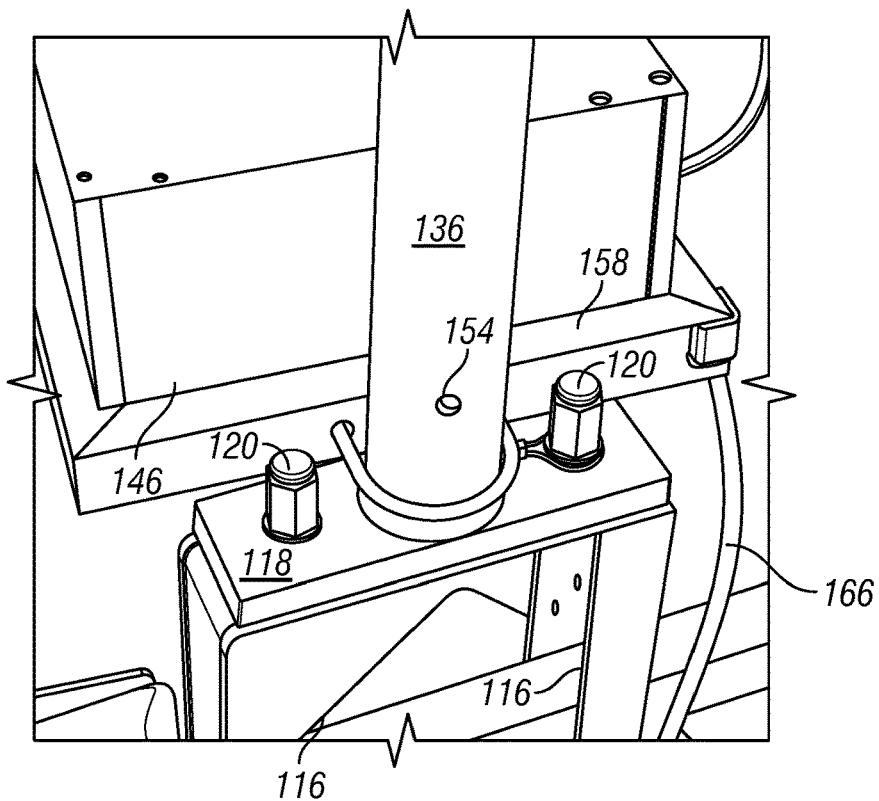
FIG. 5 is a detailed perspective view of the ADA-compliant sink assembly connected with the attachment member.

Referring now to FIG. 5, there is shown a detailed view of the connection between the attachment member 112 and the pedestal portion 136. As shown, a hole 154 on the pedestal portion 136 may be aligned with a hole on the post 122 and a pin placed therethough to rotationally lock the pedestal portion 136 and the post 122. Also shown in FIG. 5 is a power cord 166 for powering the electronics of the gray water disposal assembly 146. In the embodiment shown, the gray water disposal assembly 146 is suspended above the ground by the tray 158.

FIG. 6 is a detailed view showing the bottom of the sink portion 130. As can be seen, the drain 160 is fluidly connected with an inlet port of the gray water disposal assembly 146 via a drain pipe 162. In this embodiment, the gray water flows via gravity out of the drain 160 into the gray water disposal assembly 146, which periodically pumps the gray water into the drain tank within the trailer 100 via the drain line 148 when the gray water within the gray water disposal assembly 146 reaches a predetermined level. In this embodiment, gray water flowing out the drain 160 is collected by the drain tank.

FIG. 7 illustrates the temporary wash basin 128 in the retracted position for transport. The lines 144, 148 have been stored in the sink portion 130 for transport. In the retracted position, as shown, the pedestal portion 136 has been rotated with respect to the attachment member 112 so the temporary wash basin 128 is suspended above the tongue 104 within the footprint of the tongue 104. As discussed herein, the temporary wash basin 128 may be moved to the retracted position while the trailer is being hauled to its destination. When the trailer 100 is at its destination, the temporary wash basin 128 can be moved to the extended position (FIG. 3) extending away from the tongue 104 to provide sufficient knee clearance for a wheelchair-bound user to comply with the ADA.

As shown, the temporary wash basin 128 includes rear walls 168 to provide structural support for supporting the sink portion 130 being suspended in a cantilevered manner from the pedestal portion 136. In the embodiment shown, the rear walls 168 have a first edge 170 connected to the pedestal portion 136, a second edge 172 connected to the rear wall 163, and a third edge 174 connected with the respective walls 138, 142.

Figure 8:
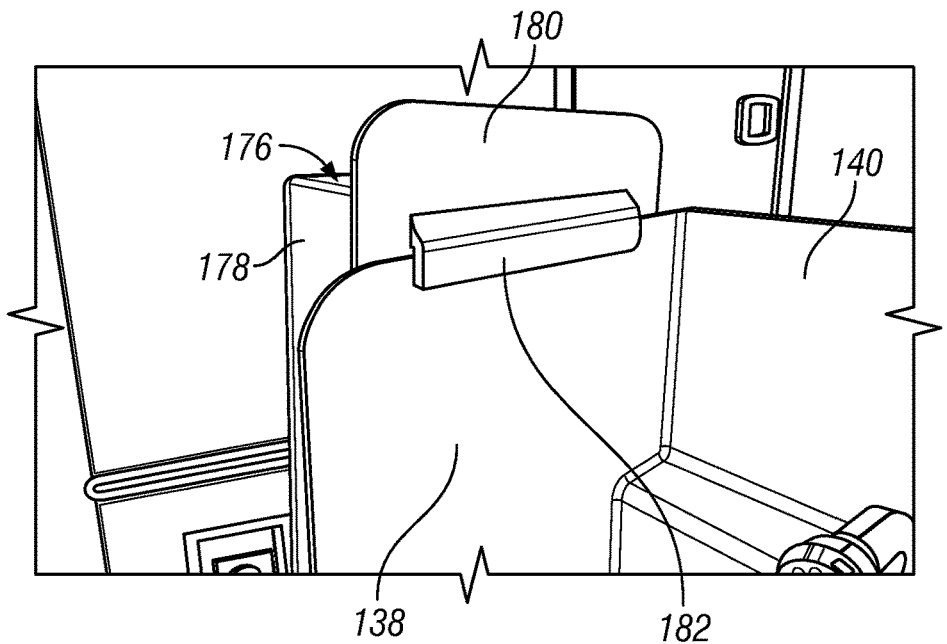
FIG. 8 is a detailed perspective view of an accessory mounted to a wall of the sink assembly.
Figure 9:
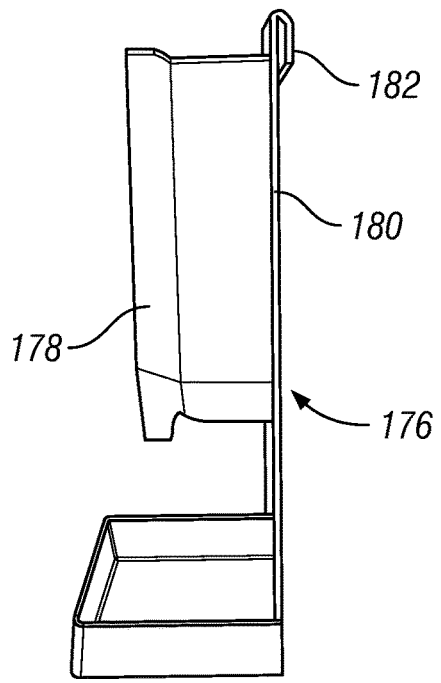
FIG. 9 is a side perspective of an example accessory that can be mounted to the temporary ADA-compliant sink assembly.

Referring now to FIGS. 8 and 9, there is shown an accessory assembly 176 for mounting to side walls 138, 142 of the temporary wash basin 128. The accessory assembly 176 shown in FIG. 9 is embodied as a liquid soap dispenser 178, but the accessory assembly 176 could be a paper towel dispenser or other accessory associated with wash basins. The accessory assembly 176, which is a soap dispenser 178 in this example, includes a mounting plate 180 with a flange 182 that can be hooked onto an edge or lip of the walls 138, 142. As shown in FIG. 8, the accessory assembly 176 is attached to the wall 138 with the accessory assembly 176 outside the sink portion 130, but the accessory assembly 176 can be reversed with the accessory within the sink portion 130. This reversed mounting orientation may be particularly useful during transport to make the envelope of the temporary wash basin 128 has narrow as possible, such as to get through the opening for the door 184 in the trailer 100 to be mounted to the second attachment member 156 as shown in FIG. 10.

Referring now to FIG. 10, the temporary wash basin 128 is illustrated mounted to the second attachment member 156 inside the trailer 100 for transport. As discussed herein, this is one manner to transport the temporary wash basin 128 depending on the circumstances. In this embodiment, the user could lift the temporary wash basin 128 off the attachment member 112 and transport the temporary wash basin 128 inside the trailer 100 where it is mounted to the second attachment member 156. As shown, the accessory assemblies 176 are reverse mounted within the sink portion 130 (as also seen in FIG. 11), which allows the temporary wash basin 128 and accessory assemblies 176 to fit through the opening of the door 184.

Figure 11:
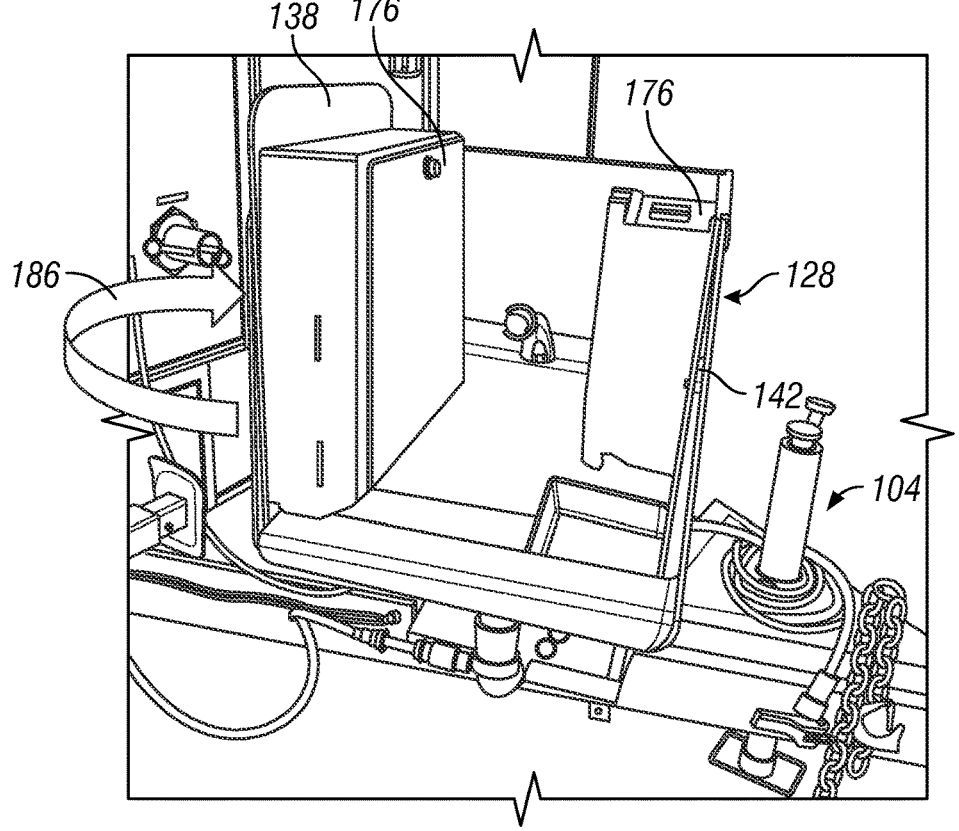
FIG. 11 is a perspective view of the temporary ADA-compliant sink assembly with accessories mounted within the sink assembly's footprint for transport.

FIG. 11 illustrates the temporary wash basin 128 with multiple accessory assemblies 176 mounted in reverse orientation with the assemblies 176 in the sink portion (i.e., between walls 138 and 142) prior to being rotated in direction of arrow 186 to the retracted position for transport.

Embodiments of this disclosure provide a solution to the technical problem of providing a trailer with externally-accessible wash basin(s) that are suitable for wheelchair-bound users.

EXAMPLES

Illustrative examples of the temporary wash basin disclosed herein are provided below. An embodiment of the temporary wash basin may include any one or more, and any combination of, the examples described below.

Example 1 is a temporary wash basin for a trailer. The temporary wash basin includes a sink portion, a faucet portion, and a pedestal portion. The sink portion includes a basin defining a drain. The faucet portion is connectable to at least one water supply line. The faucet portion is configured to control flow of water from the at least one water supply line into the basin. The pedestal portion suspends the sink portion above a surface, such as the ground, at a suitable height to establish sufficient knee clearance to comply with the American with Disabilities Act (ADA). The pedestal portion includes a mounting member to releasably mount the pedestal portion to an attachment member of a trailer.

Example 2 includes the subject matter of Example 1, and wherein the mounting member is configured to releasably mount the pedestal portion to the attachment member of the trailer with an interference fit.

Example 3 includes the subject matter of Examples 1-2, and wherein the mounting member is configured to slideably engage the attachment member of the trailer.

Example 4 includes the subject matter of Examples 1-3, and wherein the mounting member includes an opening dimensioned to receive at least a portion of the attachment member.

Example 5 includes the subject matter of Examples 1-4, and wherein the mounting member comprises a sleeve configured to receive at least a portion of the attachment member.

Example 6 includes the subject matter of Examples 1-5, and wherein the sleeve is configured to move in a telescopic manner with respect to the attachment member.

Example 7 includes the subject matter of Examples 1-6, and wherein a longitudinal axis of the pedestal portion is approximately transverse to a longitudinal axis of the faucet portion.

Example 8 includes the subject matter of Examples 1-7, and wherein the faucet portion is mounted to the pedestal portion in a cantilevered manner.

Example 9 includes the subject matter of Examples 1-8, and further including a gray water disposal assembly in fluid communication with the drain.

Example 10 includes the subject matter of Examples 1-9, and wherein the gray water disposal assembly comprises an inlet port to receive gray water flowing out of the drain and a pump to discharge gray water of an outlet port of the gray water disposal assembly.

Example 11 includes the subject matter of Examples 1-10, and further including a controller to control actuation of the pump responsive to gray water within the gray water disposal assembly reaching a predetermined fluid level.

Example 12 includes the subject matter of Examples 1-11, and further including one or more walls extending from the sink portion, wherein the one or more walls includes an edge configured to receive a flange portion of one or more of a towel dispenser or a soap dispenser.

Example 13 is a trailer with a trailer body, a trailer tongue, and a temporary wash basin. The trailer body defines an interior space. The trailer tongue extends from the trailer body for coupling the trailer body to a vehicle. The temporary wash basin is configured to be releasably mounted to one or more of the trailer body or the trailer tongue. The temporary wash basin, when mounted, is configured to be suspended above a ground at a suitable height to establish sufficient knee clearance to comply with the American with Disabilities Act (ADA).

Example 14 includes the subject matter of Example 13, and further including an attachment member extending from the trailer tongue in which the temporary wash basin is configured to be releasably mounted to the attachment member.

Example 15 includes the subject matter of Examples 13-14, and wherein the temporary wash basin includes a mounting member configured to slideably engage the attachment member.

Example 16 includes the subject matter of Examples 13-15, and wherein the mounting member includes an opening dimensioned to receive at least a portion of the attachment member.

Example 17 includes the subject matter of Examples 13-16, and wherein the mounting member comprises a sleeve and the attachment member comprises an elongated post such that the sleeve is configured to receive at least a portion of the elongated post.

Example 18 includes the subject matter of Examples 13-17, and wherein the sleeve is configured to move in a telescopic manner with respect to the elongated post.

Example 19 includes the subject matter of Examples 13-18, and wherein the temporary wash basin is configured to rotate with respect to the attachment member between a first position in which the temporary wash basin extends away from the trailer tongue to establish sufficient knee clearance between a ground and bottom of the temporary wash basin to comply with the American with Disabilities Act (ADA) and a second position in which the temporary wash basin is suspended above the trailer tongue.

Example 20 includes the subject matter of Examples 13-19 and wherein a second attachment member mounted within the interior space of the trailer body such that temporary wash basin configured to be releasably mounted interchangeably between the attachment member of the trailer tongue and the second attachment member within the interior space of the trailer body.

Example 21 is a temporary wash basin for a trailer. The temporary wash basin includes a sink portion, a faucet portion, and means for suspending the wash basin above a ground. The sink portion includes a basin defining a drain. The faucet portion is connectable to at least one water supply line. The faucet portion is configured to control flow of water from the at least one water supply line into the basin. The means for suspending the wash basin is configured to suspend pedestal portion above a surface, such as the ground, at a suitable height to establish sufficient knee clearance underneath the sink portion for a wheelchair-bound user.

Example 22 includes the subject matter of Example 21 and wherein the means for suspending the temporary wash basin is configured to rotate the temporary wash basin between an extended position and a retracted position. In the extended position, the temporary wash basin extends away from the trailer to provide sufficient knee clearance underneath the sink portion for a wheelchair-bound user. In the retracted position, the temporary wash basin is within the footprint of the trailer and/or tongue for hauling the trailer.

The invention claimed is:

1. A temporary wash basin for a trailer, the temporary wash basin comprising:
   a sink portion comprising a basin defining a drain;
   a faucet portion connectable to at least one water supply line, wherein the faucet portion is configured to control flow of water from the at least one water supply line into the basin; and
   a pedestal portion suspending the sink portion above a surface at a suitable height to establish sufficient knee clearance to comply with the American with Disabilities Act (ADA), wherein the pedestal portion includes a mounting member to releasably mount the pedestal portion to an attachment member of a trailer.

2. The temporary wash basin of claim 1, wherein the mounting member is configured to releasably mount the pedestal portion to the attachment member of the trailer with an interference fit.

3. The temporary wash basin of claim 1, wherein the mounting member is configured to slideably engage the attachment member of the trailer.

4. The temporary wash basin of claim 1, wherein the mounting member includes an opening dimensioned to receive at least a portion of the attachment member.

5. The temporary wash basin of claim 1, wherein the mounting member comprises a sleeve configured to receive at least a portion of the attachment member.

6. The temporary wash basin of claim 5, wherein the sleeve is configured to move in a telescopic manner with respect to the attachment member.

7. The temporary wash basin of claim 1, wherein a longitudinal axis of the pedestal portion is approximately transverse to a longitudinal axis of the faucet portion.

8. The temporary wash basin of claim 1, wherein the faucet portion is mounted to the pedestal portion in a cantilevered manner.

9. The temporary wash basin of claim 1, further comprising a gray water disposal assembly in fluid communication with the drain.

10. The temporary wash basin of claim 9, wherein the gray water disposal assembly comprises an inlet port to receive gray water flowing out of the drain and a pump to discharge gray water out of an outlet port of the gray water disposal assembly.

11. The temporary wash basin of claim 10, further comprising a controller to control actuation of the pump responsive to gray water within the gray water disposal assembly reaching a predetermined fluid level.

12. The temporary wash basin of claim 1, further comprising one or more walls extending from the sink portion, wherein the one or more walls includes an edge configured to receive a flange portion of one or more of a towel dispenser or a soap dispenser.

13. A temporary wash basin comprising:
   a sink portion comprising a basin defining a drain;
   a faucet portion connectable to at least one water supply line, wherein the faucet portion is configured to control flow of water from the at least one water supply line into the basin; and
   a pedestal portion suspending the sink portion above a surface at a suitable height to establish sufficient knee clearance to comply with the American with Disabilities Act (ADA), wherein the pedestal portion includes a mounting member to releasably mount the pedestal portion to a portable support structure.

14. The temporary wash basin of claim 13, wherein the mounting member is configured to releasably mount the pedestal portion to the portable support structure with an interference fit.

15. The temporary wash basin of claim 13, wherein the mounting member is configured to mount the pedestal portion by slideably engaging the portable support structure.

16. The temporary wash basin of claim 13, wherein the mounting member includes an opening dimensioned to receive at least a portion of the portable support structure.

17. The temporary wash basin of claim 13, wherein the mounting member comprises a sleeve configured to receive at least a mounting portion of the portable support structure.

18. The temporary wash basin of claim 17, wherein the sleeve is configured to move in a telescopic manner with respect to the mounting portion of the portable support structure.

19. The temporary wash basin of claim 13, wherein a longitudinal axis of the pedestal portion is approximately transverse to a longitudinal axis of the faucet portion.

20. A temporary wash basin comprising:
   a sink portion comprising a basin defining a drain;
   a faucet portion connectable to at least one water supply line, wherein the faucet portion is configured to control flow of water from the at least one water supply line into the basin; and
   a pedestal portion suspending the sink portion above a surface at a suitable height to establish sufficient knee clearance to comply with the American with Disabilities Act (ADA), wherein the pedestal portion includes means for releasably mounting the pedestal portion to a portable support structure.

* * * * *